June 19, 1956 H. L. OWENS 2,750,654
MINIATURE RECTIFIER
Filed Oct. 3, 1950
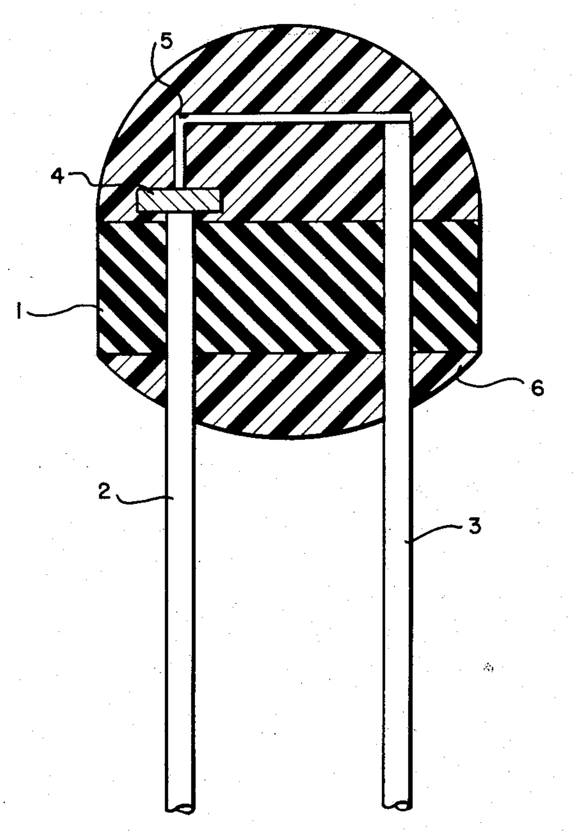
INVENTOR.
HARRY L. OWENS
BY
Harry M. Saragovitz
Attorney United States Patent Office 2,750,654

Patented June 19, 1956

2,750,654

MINIATURE RECTIFIER

Harry L. Owens, Belmar, N. J., assignor to the United States of America as represented by the Secretary of the Army Application October 3, 1950, Serial No. 188,257

1 Claim. (Cl. 29—25.3)

(Granted under Title 35, U. S. Code (1952), sec. 266)

The invention described herein may be manufactured and used by or for the Government for governmental purposes, without the payment to me of any royalty thereon.

This invention relates to crystal rectifiers and more particularly to point contact crystal rectifiers of miniature size and to methods for making them.

Point contact crystal rectifiers are well known in the art and there are many types as, for instance, that shown in the patent to Brittain et al. No. 2,472,938. They are usually of considerably larger size than that of the instant invention and their assembly is comparatively complicated and difficult.

It is therefore an object of this invention to make a point contact rectifier of extremely small size.

It is another object of this invention to make a contact rectifier of small size which is easy to assemble and which requires no additional sealing to prevent deterioration of the point contact.

These and other objects of the invention will be readily apparent from the following description taken in connection with the accompanying drawing, which shows a cross-section of the completed rectifier.

Referring now to the figure of the drawing there is shown an insulating washer or spacer 1 through which two leads 2 and 3 are threaded or into which they are molded. A germanium crystal, which is etched and otherwise prepared in a manner well known in the art, is nickel plated on one surface. This surface is then tinned. The crystal is secured to the lead 2 by soft solder. A cat whisker 5 is secured, by soldering or welding, to the other lead and is adjusted so that the sharpened point contacts an appropriate portion of the germanium crystal. The unit is then dipped into a suitable sealing plastic of such viscosity that when removed a bead of plastic will form completely enclosing the unit. One plastic which has been found to be suitable bears the trade name "Selectron 5026." This particular plastic becomes hard after curing for two hours at 60° centigrade which thereby obviates the necessity for providing a protective housing and additionally protects the elements against mechanical shock. Thermal conductivity of the plastic can be increased by roughening the surface and also by coloring it in accordance with well known "black body" radiation effects. The rectifier is then "formed" in the usual manner by passing pulses of current up to several hundred milliamperes through the rectifier in the forward direction. It was found that 60 cycle A. C. was also effective for this purpose.

As an example of the small size of the rectifier, the following dimensions were found to be satisfactory in the production of one rectifier.

Spacer dimensions—.143 x .05 inch.
Size of germanium crystal—.040 x .040 x .020 inch.
Wire lead—10. mil.
Cat whisker—5. mil.

It was found that the capacitance of the unit was extremely small, being of the order of 0.1 micromicrofarad. The unit operated without undue losses at frequencies as high as 100 megacycles.

It will be apparent therefore that the rectifier of this invention is small, light and easier to manufacture. The parts require few machining operations and permits easy adjustment of the cat whisker.

While there has been shown the preferred embodiment of this invention, it will be apparent to those skilled in the art that many changes and modifications can be made without departing from the scope of the invention.

What is claimed is:

The method of fabricating a semiconductor device comprising initially positioning an insulating spacer near one end of a plurality of conductive leads; operatively attaching the semiconductor at said end of said conductive leads; dipping said insulating spacer, said semiconductor and said end portion of said conductive leads in a thermoplastic where upon solidification said plastic forms a solid bead which encases and fixes said spacer, said semiconductor and said conductive leads in position to form an integral device.

References Cited in the file of this patent

UNITED STATES PATENTS

| | | |
|---|---|---|
| 2,402,839 | Ohl | June 25, 1946 |
| 2,406,405 | Salisbury | Aug. 27, 1946 |
| 2,475,641 | Rosenberg | July 12, 1949 |
| 2,538,593 | Rose | Jan. 16, 1951 |
| 2,572,801 | Casellini | Oct. 23, 1951 |
| 2,586,609 | Burke | Feb. 19, 1952 |